US006026782A

United States Patent [19]

Daly et al.

[11] Patent Number: 6,026,782

[45] Date of Patent: Feb. 22, 2000

[54] THROTTLE BODY AND BRACKET ARRANGEMENT

[75] Inventors: Paul D. Daly, Troy; Jakub E. Mika, Wixom, both of Mich.

[73] Assignee: Siemens Canada Limited, Ontario, Canada

[21] Appl. No.: 09/165,443

[22] Filed: Oct. 1, 1998

Related U.S. Application Data

[60] Provisional application No. 60/060,581, Oct. 1, 1997.

[51] Int. Cl.[7] ................................ F02D 9/08; F16K 1/22

[52] U.S. Cl. ............................................ 123/337; 251/305

[58] Field of Search .................................... 123/337, 403, 123/585; 251/282, 305

[56] References Cited

U.S. PATENT DOCUMENTS

| | | | |
|---|---|---|---|
| 4,907,547 | 3/1990 | Daly | 123/52 M |
| 5,078,111 | 1/1992 | McCann | 123/400 |
| 5,188,078 | 2/1993 | Tamaki | 123/403 |
| 5,575,256 | 11/1996 | Peters et al. | 123/337 |
| 5,693,264 | 12/1997 | Fricke | 261/64.6 |
| 5,746,177 | 5/1998 | Criss et al. | 123/337 |

*Primary Examiner*—Andrew M. Dolinar
*Assistant Examiner*—Mahmoud M. Gimie

[57] ABSTRACT

A throttle body and bracket assembly permits the joining of the bracket to the throttle body without fasteners by incorporating preselected and complementary geometries on a mating portion of the bracket and on a portion of the throttle body. These mating portions, which may be in the form of a dovetail-type configuration, may be fit together in locking fashion, and the bracket may be further held in place by securing a lip or retainer portion of the bracket between the free ends of the air hose and the throttle body when they are joined. Additionally, a throttle body may be molded to include an idle air by-pass passage having an open, exterior surface that is sealed by the mating portion of the bracket when it is placed in its mated position with the throttle body.

20 Claims, 4 Drawing Sheets

THROTTLE BODY AND BRACKET ARRANGEMENT

This application claims the benefit of the Oct. 1, 1997 filing date of U.S. Provisional Patent Application No. 60/060,581.

FIELD OF THE INVENTION

The present invention relates to throttle bodies and bracket arrangements in general and, in particular, to brackets for use with throttle bodies and throttle bodies having air by-pass passages.

BACKGROUND

In existing molded throttle body manifolds, a bracket for supporting cables is connected to the manifold by means of fasteners, such as bolts, which are threaded into inserts in the manifold. Assembly and disassembly of manifold-bracket arrangements of this type, requiring threading and unthreading of bolts or the like into their respective inserts, are labor intensive tasks.

Furthermore, it has not been possible to mold a throttle body that incorporates an idle air by-pass passage, since a closed tube of this sort cannot, as a matter of topology, be created via a molding process. Rather, idle air by-pass passages are believed to have been fabricated separately from the throttle body as a matter of necessity, resulting in more complex and costly manufacturing and assembly processes for these parts.

SUMMARY OF THE INVENTION

The throttle body and bracket according to the present invention provides solutions to the problems set forth above by providing for structures that allow ease of assembly of throttle bodies and the attendant brackets without a need for separate fasteners or threaded inserts in the molded or cast part. Replacement brackets are easily assembled and, by shaping the bracket, various throttle body accessories can be attached to the throttle body. In addition, it allows vertical and horizontal passages or other intersecting passages in a molded or cast structure to be closed by an other member, for example an otherwise required member such as a bracket. The passages, which when molded are open either along their length or at both ends, are closed off in an air-tight manner. Horizontal or substantially horizontal passages become blind passages in that one end is closed without a need for plugs or the like.

In accordance with an embodiment of one aspect of the present invention, a throttle body is used in combination with a bracket that includes a mating portion having a preselected geometry. The throttle body according to the invention comprises a wall having an interior surface defining an air passage, and an exterior surface. The exterior surface includes a receiving surface for receiving the bracket and the receiving surface has a preselected geometry that is complementary to the geometry of the mating portion of the bracket.

In accordance with an embodiment of a another aspect of the present invention, a bracket is used in combination with a throttle body and for supporting additional apparatus, in which the throttle body includes a portion having a preselected geometry. The bracket comprises a receiving portion for receiving the apparatus and a mating portion, coupled to the receiving portion. The mating portion has a geometry that is complementary to the geometry of the receiving surface of the throttle body, for coupling the bracket to the throttle body.

DETAILED DESCRIPTION OF THE INVENTION

Figure 1:
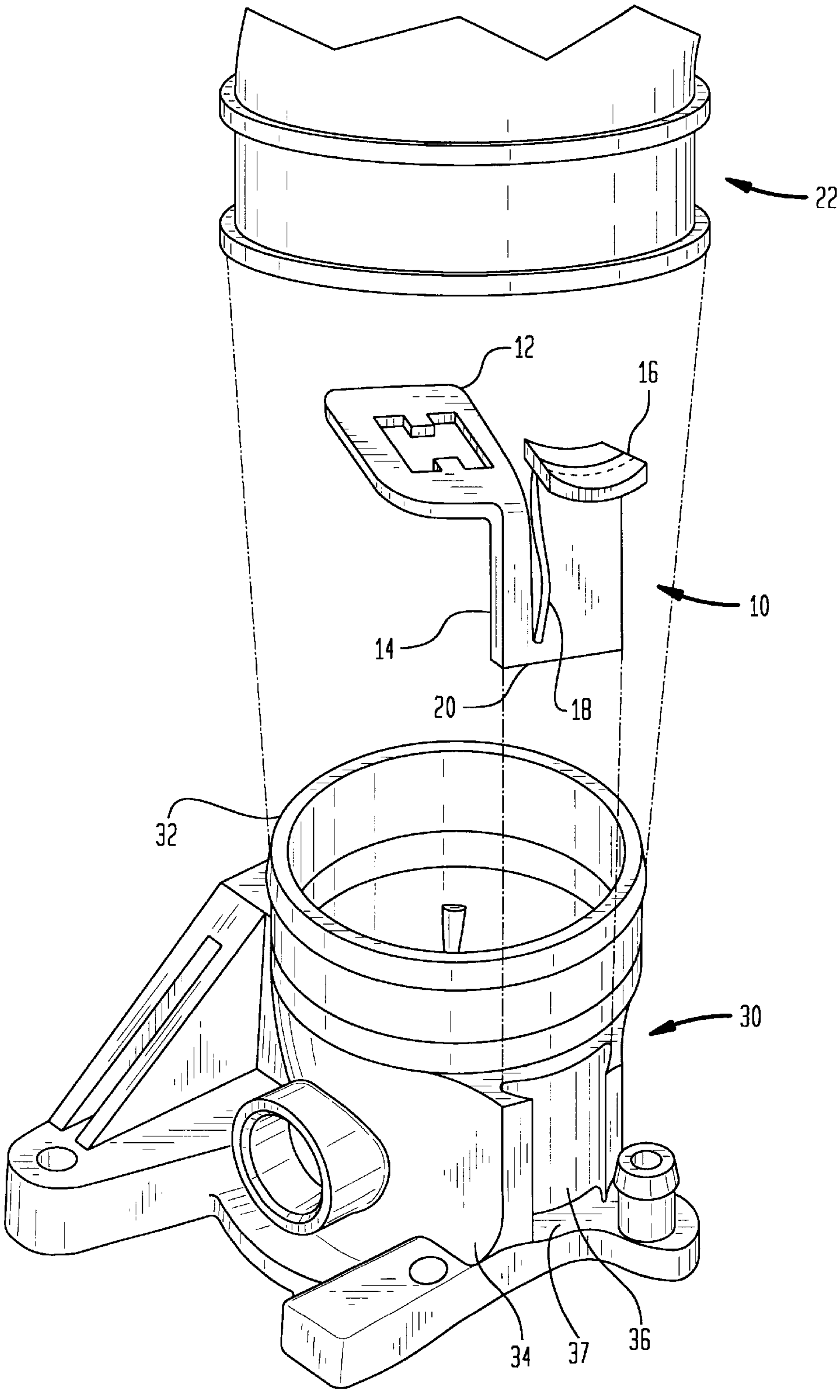
FIG. 1 provides an exploded perspective view of an embodiment of the present invention, comprising an assembly of an air cleaner hose cable retaining bracket and throttle body: at the top of the figure is the free end of the air cleaner hose; intermediate the figure is a cable retaining bracket for locating and securing the necessary throttle cables to the throttle body; and at the lower end of the figure is a throttle body preferably either molded plastic or cast metal construction.

FIG. 1 provides an illustration of an exploded view of an embodiment of the bracket and throttle body according to the present invention. Athough denominated a cable receiving bracket or retaining clip (or simply "bracket"), it may be designed to receive apparatus other than, or in addition to, cables. A bracket 10, may be formed of any suitable material. For example, it may be molded from a plastic material; or it may be cast, or stamped and formed, of metal. The bracket 10 has a receiving portion 12, preferably extending in a direction away from a leg or mating portion 14. Receiving portion 12 of bracket 10 may be in the form of a clip, a planar tab having an aperture, or other suitable configuration having structure to support a throttle cable and/or other apparatus (not shown). Apparatus that may be secured to receiving portion 12 includes, without limitation, an idle speed motor, throttle position sensor, or other component.

The bracket 10 also includes a mating portion 14 having a preselected geometry including one or more convex or concave contours capable of forming an interlocking joint with complementary preselected contours. For example, but without limitation, the preselected contours may take the form of the convex and concave halves of a dovetail. The contours may be curved, rectilinear or a combination of both curved and rectilinear geometries, as will be further described below. Also as described below, the geometry of mating portion 14 preferably corresponds closely to, or is geometrically complementary to, a receiving portion of a throttle body 30. The mating portion 14 of bracket 10 may be a downwardly extending leg, as shown, or of a suitable alternative form.

Figure 2:
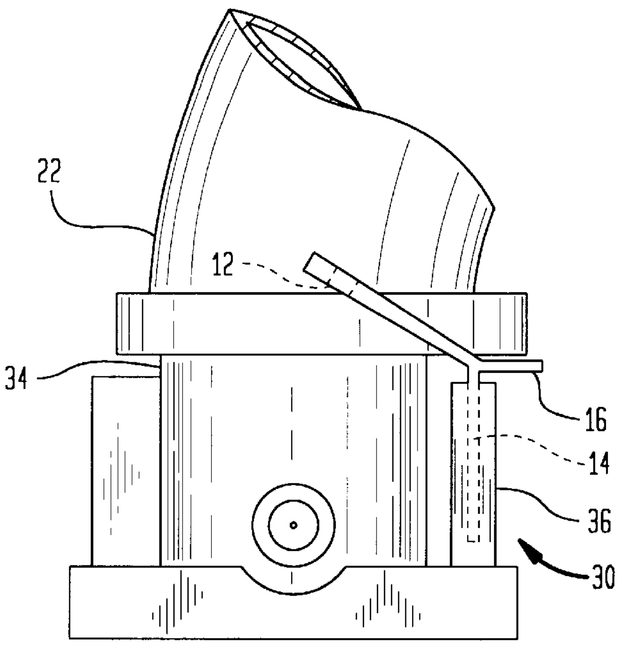
FIG. 2 provides an elevational view of an embodiment of the present invention, comprising an assembly of an air cleaner hose, cable retaining bracket and throttle body.

The bracket 10 may also include a retaining portion or lip 16, which may extend radially relative to mating portion 14. When air cleaner hose 22 and throttle body are 30 are assembled, retaining portion 16 meets, and is held in position by and between, the downstream end of the air cleaner hose 22 and the free end 32 of throttle body 30. The retention of retaining portion 16 between the throttle body 30 and the air hose 22 is illustrated in FIG. 2. Other arrangements and orientations of the component portions of bracket 10 that achieve the function of the illustrated embodiment are also contemplated by, and fall within the scope of, the present invention.

According to the present invention, mating portion 14 of bracket 10, has a geometry preselected to be complementary to, and to create an interlocking joint with, a geometry of a receiving surface 36 on the exterior wall 34 of throttle body 10. For example, but without limitation, mating portion 14 of bracket 10 may have two parallel, spaced, longitudinally extending chamfers that mate with, and are retained by, corresponding chamfers on exterior wall 34 of the throttle body 30, forming a dovetail-type connection. This locking, complementary configuration permits a secured, and if desired, releasably secured, coupling of the bracket 10 to the throttle body 30.

Figure 5:
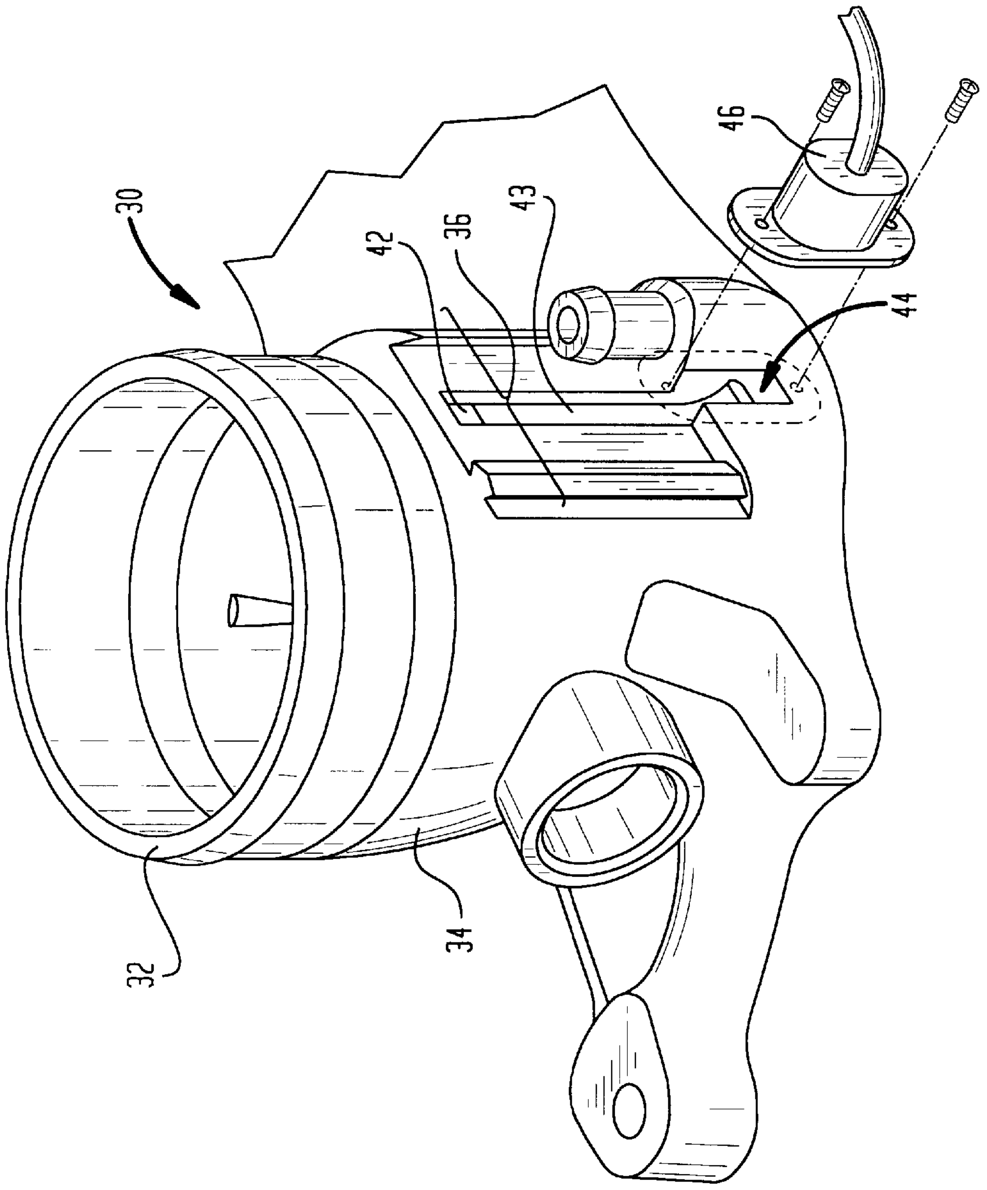
FIG. 5 provides a perspective view of an embodiment of a throttle body for receiving a bracket.

In the illustrated embodiment, when the bracket 10 is coupled to the throttle body 30 during the assembly of the arrangement, it is slid along throttle body 30 in a direction parallel to the axis of rotation of the throttle body 30 from its upstream end toward its downstream end, and in the groove created by the chamfers on the throttle body 30. The complementary receiving surfaces of mating portion 14 of bracket 10 and bracket receiving portion 36 of throttle body 30 may permit a locking, friction fit, with retention of the bracket 10 being optionally reinforced by the locking of retaining portion 16 of bracket 10 by the end of air cleaner hose 22. An alternative mechanism for retaining bracket 10 is by fastening an additional component, for example an idle speed motor, throttle position sensor, or other component, as shown in FIG. 5 and described in the accompanying text.

In the illustrated embodiment, bracket receiving surface 36 includes a surface occupying a longitudinal groove, of a width corresponding to that of mating portion 14 of bracket 10, the groove bordered on each side by a longitudinal chamfer. Each chamfer provides a restraint on the mating surface 14 in a radially outward direction. The chamfers, and the surface occupying the groove between them, may be dimensioned to retain mating portion 14 in the longitudinal direction by way of a friction fit. The exterior face of the groove, which is open prior to receiving the bracket 10, is closed by the mating surface 14 of bracket 10 upon its being slid into position. When in place, an end portion 20 of bracket 10 may meet and rest upon, or otherwise abut, a terminus 37 of bracket receiving surface 36, which in the illustrated embodiment is a horizontal surface extending away from the throttle body 30.

To further secure the bracket 10 to the throttle body 30, the downstream end of the air cleaner hose 22 comes to rest on the retaining portion 16 of the bracket 10. Air hose 22 is then secured, e.g., in the conventional manner, to the throttle body 30. The bracket 10 is thus fixed by having its retaining portion 16 be sandwiched between a horizontal surface on the throttle body 30 (free end 32 at a position aligned with receiving surface 36) and the mating downstream end of the air cleaner hose 22. The locking, complementary fit of the mating surface 14 of the bracket 10 with the receiving surface 36 of throttle body 30, which in the illustrated embodiment provides a dovetail-type sliding fit, prevents the bracket 10 from becoming detached from throttle body 30. A throttle cable or other throttle accessory or apparatus (not shown) is then mounted to the bracket 10.

Figure 3:
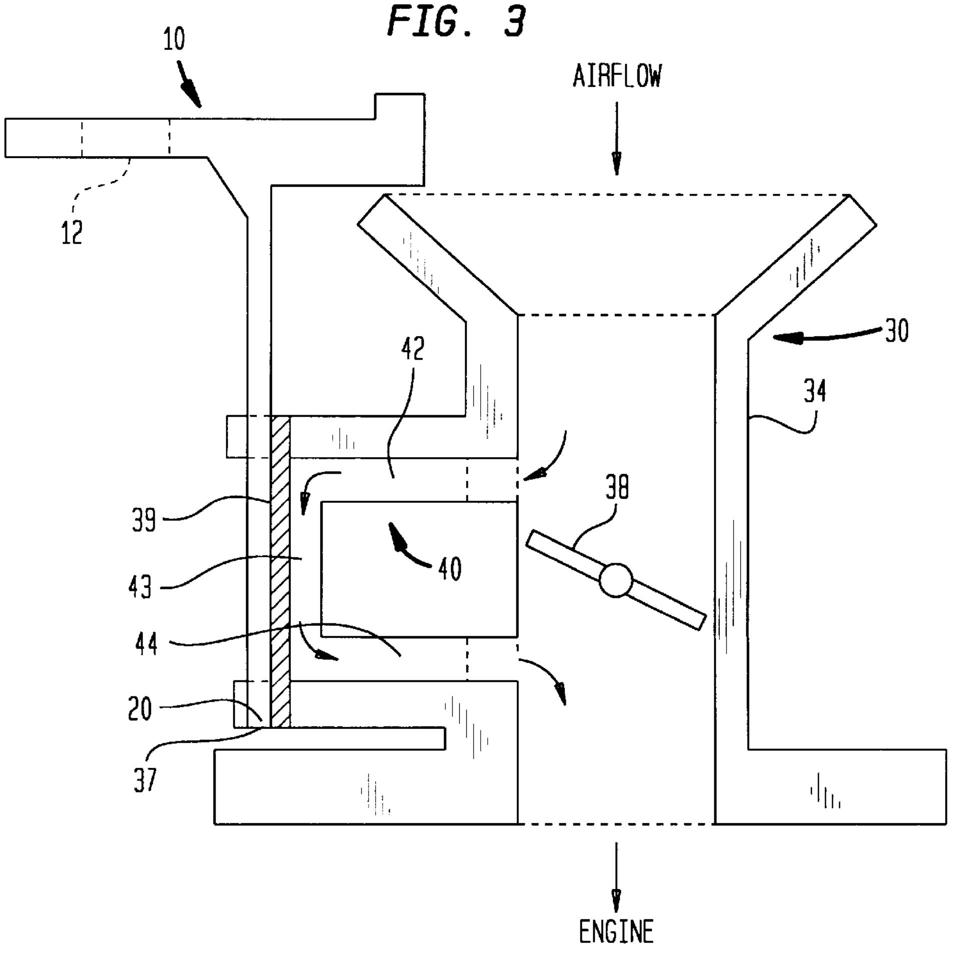
FIG. 3 provides an elevational, sectional view of an embodiment of an assembly of a cable retaining bracket and a throttle body.

In order to keep an engine running, a throttle body (such as throttle body 30) requires an associated idle air by-pass passage to bring clean air from an air cleaner (not shown) to the downstream side of a throttle valve (e.g., throttle valve 38 in FIG. 3) when that valve is closed. According to an aspect of the present invention, throttle body 30 may be molded, by means of cores, to include an idle air by pass passage 40 (or simply "by-pass") in the side of the throttle body 30. An external surface 43 of the idle air by-pass 40 may, according to the present invention, be closed off by a preselected complementary mating surface of other apparatus. No additional plug is required, and by-pass air can proceed, without leakage, to downstream portion 44, maintaining engine idle. For example, but without limitation, mating surface 14 of bracket 10, may cover the external surface 43 of idle air by-pass 40 when received by the complementary bracket receiving surface 36 of throttle body 10. This aspect of the present invention is further illustrated in FIGS. 4 and 5, and the text accompanying those figures.

Figure 4:
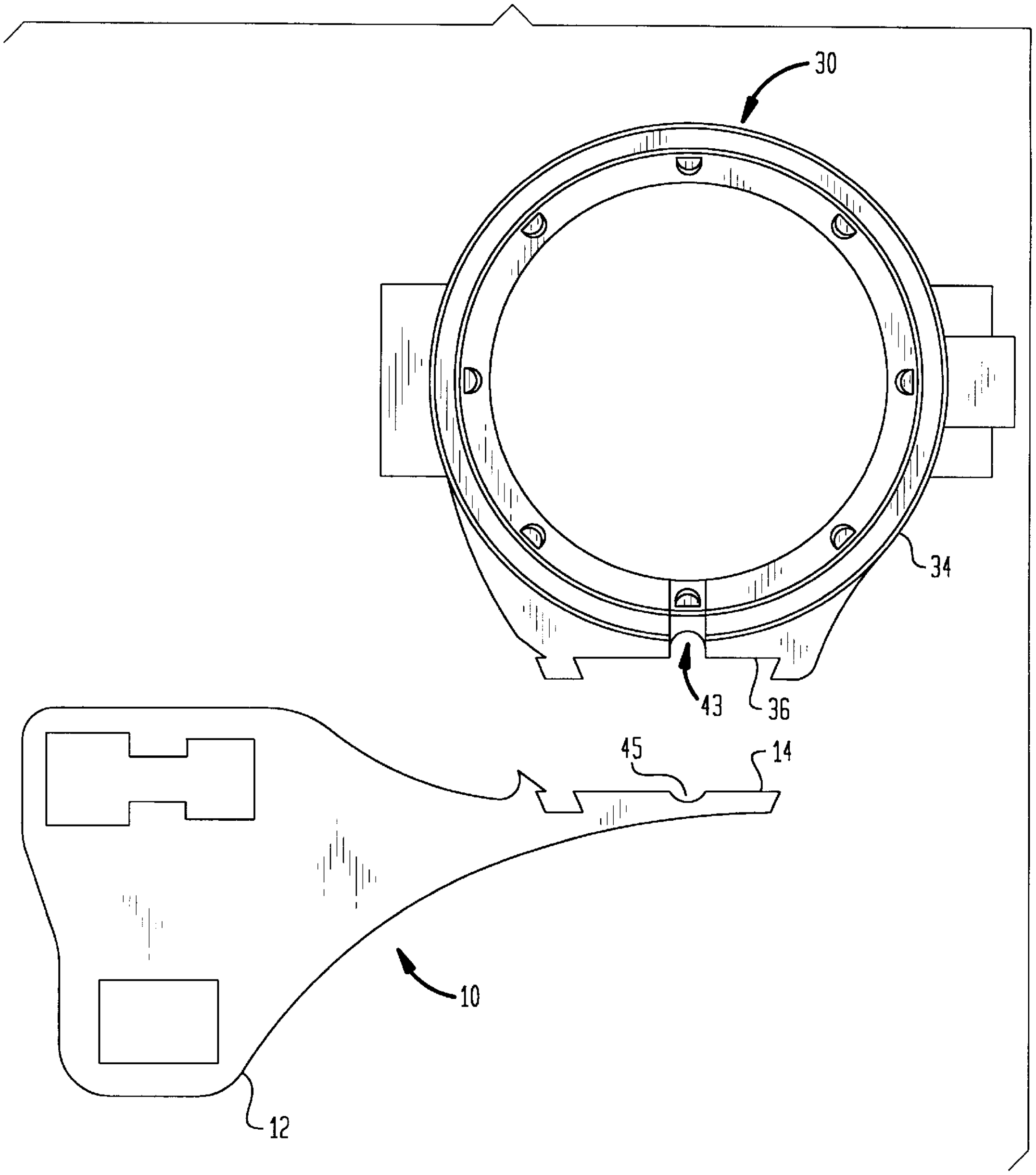
FIG. 4 provides an exploded, plan, sectional view of an embodiment of an assembly of a cable retaining bracket and a throttle body showing an idle air by-pass formed by the assembly of the two components.

FIG. 4 shows the preselected geometries of the throttle body 30, including the exposed portion 43 of the idle air by-pass passage 40. In addition, it shows the complementary preselected geometry of an object (here bracket 10) capable of forming an interlocking joint. Note that the object can be molded to include a portion 45 shaped to increase the effective cross-sectional area of the exposed portion 43 of the idle air by-passage passage 40. To further ensure the prevention of leakage of by-pass air, a sealing element or treatment 39 (visible in FIG. 3) may be disposed between the mating portion 14 of bracket 10 and the bracket receiving surface 36.

FIG. 5 provides a perspective view of the throttle body 30 according to the present invention. In addition to showing the receiving surface 36, the upstream 42, exposed 43 and downstream 44 portions of the idle air by-pass passage 43, the figure also shows how an idle speed motor, throttle position sensor, or other component 46 can be joined to the throttle body 30 to further retain a bracket 10 coupled via receiving surface 36.

In the illustrated embodiment, the upstream portion of idle air by-pass 40 is formed similarly to the downstream portion 44, an intersecting passage intersecting the idle air by-pass passage 40 in such a location that it, too, is closed off by the downward depending leg of the bracket 10. In the alternative, the idle air by-pass passage 40 maybe open at the upstream end to be closed by the air cleaner hose 22 such that only air from the air cleaner can flow therealong.

The foregoing description has set forth how the objects of the present invention can be fully and effectively accomplished. The embodiments shown and described for purposes of illustrating the structural and functional principles of the present invention, as well as illustrating the methods of employing the preferred embodiments, are subject to change without departing from such principles. Therefore, this invention includes all modifications encompassed within the spirit of the following claims. For example, the throttle body is shown in the illustrated embodiment as a stand-alone part. Alternatively, and consistent with all aspects of the present invention, it could also be molded in a single piece along with a manifold. As another example, the exposed portion 43 of idle air by-pass passage 40 need not be sealed by a portion of a bracket 10, but could be sealed by any component having preselected mating geometry complementary to the receiving surface 36 of throttle body 10.

What is claimed is:

1. A throttle body for use in combination with a bracket, the bracket including a mating portion having a preselected geometry, the throttle body comprising: a wall having an interior surface defining an air passage, and an exterior surface, the exterior surface including a receiving surface for receiving the bracket, the receiving surface having a preselected geometry that is complimentary to the geometry of the mating portion of the bracket, the preselected geometry of the receiving surface comprising at least one convex surface parallel to the axis of rotation of the throttle body, wherein the convex surface comprises a chamfer.

2. The throttle body according to claim 1, comprising a second convex surface comprising a chamfer.

3. The throttle body according to claim 1, wherein the throttle body is molded.

4. The bracket according to claim 3, also for use with a hose to be coupled to an upstream end of the throttle body, the bracket further comprising a retaining surface coupled to the receiving portion and the mating portion, such that when the bracket has been received by the receiving surface of the throttle body and the hose is coupled to the upstream end of the throttle body, the retaining surface is disposed between the hose and the throttle body, thereby securing the bracket.

5. A throttle body for use in combination with a bracket, the bracket including a mating portion having a preselected geometry, the throttle body comprising: a wall having an interior surface defining an air passage, and an exterior surface, the exterior surface including a receiving surface for receiving the bracket, the receiving surface having a preselected geometry that is complimentary to the geometry of the mating portion of the bracket, wherein the preselected geometries form a dovetail-type joint.

6. A bracket for use in combination with a throttle body and for supporting additional apparatus, the throttle body including a portion having a preselected geometry, the bracket comprising: a receiving portion for receiving the apparatus; and a mating portion, coupled to the receiving portion, and having a geometry that is complementary to the geometry of the receiving surface of the throttle body, for coupling the bracket to the throttle body.

7. The bracket according to claim 6, wherein the receiving portion and the mating portion are formed integral to one another.

8. The bracket according to claim 6, wherein the additional apparatus comprises a throttle body accessory.

9. The bracket according to claim 8, wherein the throttle body accessory comprises a cable, and wherein the receiving portion comprises a member having an aperture through which the cable can be passed.

10. The bracket according to claim 6, for use with a throttle body molded to include an idle air by-pass passage including one portion that is exposed to atmosphere, such that the exposed portion is closed upon receipt of the mating portion by the throttle body receiving surface, further comprising: a sealing element coupled to the mating portion of the bracket for sealing the exposed portion of the idle air by-pass passage to prevent the escape of by-pass air from the passage.

11. A molded throttle body for use in connection with a mating member shaped to fit a complementary portion of the throttle body when coupled thereto, the throttle body comprising a circumferential wall defining a primary air passage, the wall further including an idle air by-pass passage, the idle air by-pass passage including an exposed portion to facilitate molding, the exposed portion covered when the mating member is coupled to the throttle body.

12. The molded throttle body according to claim 11, used in connection with additional apparatus, wherein the mating member is coupled to a receiving member for receiving and supporting the apparatus.

13. The assembly according to claim 12, for use with an air hose, the bracket further comprising a retaining surface that, when the hose and throttle body are coupled, is disposed therebetween to secure the bracket in place.

14. The assembly according to claim 12, wherein the throttle body further includes an idle air by-pass passage, the passage having an exposed portion to facilitate molding, the exposed portion positioned in the throttle body such that when the bracket mating portion is fit into the throttle body receiving surface, the bracket mating portion covers the exposed portion of the passage.

15. The assembly according to claim 14, further comprising a sealing member disposed between the mating portion of the bracket and the receiving surface of the throttle body to facilitate sealing of the idle air by-pass passage.

16. The assembly according to claim 14, further comprising an idle speed motor coupled to the throttle body in the vicinity of the mating portion of the bracket so as to further retain the bracket coupled to the receiving surface of the throttle body.

17. A throttle body assembly for use with associated apparatus, the assembly comprising:

- a. a molded throttle body having an exterior surface including a receiving portion having a preselected geometry; and
- b. a bracket having
  - i. a mating portion having a preselected geometry complementary to that of the receiving portion of the throttle body; and
  - ii. a receiving portion adapted to receive and support the associated apparatus.

18. The assembly according to claim 17, wherein the complementary geometries form a dove-tail-type joint.

19. In a molded throttle body for use with an air cleaner hose and having a given dimensional shape, a bracket member for securing a throttle body accessory, the bracket comprising at least one surface substantially fitting the dimensional shape of the throttle body in dovetail fashion to be releasably secured to the throttle body, and maintained in position by the downstream end of the air cleaner hose and the portion of the throttle body to which the hose is coupled.

20. In a molded throttle body, a bracket member has at least on surface having the same or substantially the same dimensional shape of the throttle body is dovetailed to the throttle body in a releasably secured manner to form an enclosing cover to an extending passage along said throttle body and to seal any intersecting passages to the extending passage, the bracket member having at least one mating dovetail surface for fastenerless securing such bracket to the throttle body.

* * * * *